United States Patent
Wu et al.

(10) Patent No.: US 11,313,073 B2
(45) Date of Patent: Apr. 26, 2022

(54) METHOD OF MANUFACTURING GRAPHENE CONDUCTIVE FABRIC

(71) Applicant: Enerage Inc., Wujie Township, Yilan County (TW)

(72) Inventors: Mark Y. Wu, Wujie Township, Yilan County (TW); Cheng-Yu Hsieh, Wujie Township, Yilan County (TW); Jing-Ru Chen, Wujie Township, Yilan County (TW)

(73) Assignee: ENERAGE INC., Wujie Township (TW)

( * ) Notice: Subject to any disclaimer, the term of this patent is extended or adjusted under 35 U.S.C. 154(b) by 302 days.

(21) Appl. No.: 16/569,131

(22) Filed: Sep. 12, 2019

(65) Prior Publication Data
US 2020/0087850 A1 Mar. 19, 2020

(30) Foreign Application Priority Data
Sep. 14, 2018 (TW) ................. 107132555

(51) Int. Cl.
*D06M 11/74* (2006.01)
*D06M 10/06* (2006.01)
(Continued)

(52) U.S. Cl.
CPC ............ *D06M 11/74* (2013.01); *D02G 3/441* (2013.01); *D06M 10/06* (2013.01); *D06M 15/564* (2013.01); *D06M 15/643* (2013.01); *D06M 17/06* (2013.01); *D06M 17/08* (2013.01); *D06M 23/10* (2013.01); *D06M 2101/26* (2013.01);
(Continued)

(58) Field of Classification Search
CPC ..................................................... D06M 11/74
See application file for complete search history.

(56) References Cited

U.S. PATENT DOCUMENTS 6,957,525 B2 10/2005 Verstraeten et al.
7,767,298 B2 8/2010 Nakatsuka et al.
(Continued)

FOREIGN PATENT DOCUMENTS

CN 106283609 A 1/2017
CN 107031149 A 8/2017
(Continued)

*Primary Examiner* — Andrew T Piziali
(74) *Attorney, Agent, or Firm* — Muncy, Geissler, Olds & Lowe, P.C.

(57) ABSTRACT

Disclosed is a method of manufacturing a graphene conductive fabric, which includes mixing a first solvent, a second solvent and nano-graphene sheets, dispersing the nano-graphene sheets with a mechanical force to form a graphene suspension solution; adding at least a curable resin to the graphene suspension solution, dispersing the nano-graphene sheets and the curable resin with the mechanical force to form a graphene resin solution; coating or printing the graphene resin solution on a hydrophobic protective layer, curing the graphene resin solution to form a graphene conductive layer adhered to the hydrophobic protective layer; coating a hot glue layer on the graphene conductive layer; and attaching a fibrous tissue on the hot glue layer, heating and pressing the fibrous tissue to allow the hot glue layer respectively adhere to the graphene conductive layer and the fibrous tissue.

9 Claims, 1 Drawing Sheet

(51) Int. Cl.
   *D06M 17/06*    (2006.01)
   *D06M 17/08*    (2006.01)
   *D06M 23/10*    (2006.01)
   *D06M 15/564*   (2006.01)
   *D02G 3/44*     (2006.01)
   *D06M 15/643*   (2006.01)
   *D06M 101/32*   (2006.01)
   *D06M 101/26*   (2006.01)

(52) U.S. Cl.
   CPC ..... *D06M 2101/32* (2013.01); *D10B 2401/16* (2013.01)

(56) References Cited

U.S. PATENT DOCUMENTS

| | | | |
|---|---|---|---|
| 10,829,872 B2 * | 11/2020 | Wang | D06M 10/06 |
| 2011/0245378 A1 * | 10/2011 | Russ | C08K 3/042 |
| | | | 523/440 |
| 2013/0090030 A1 * | 4/2013 | Van De Vyver | D06M 15/55 |
| | | | 442/111 |
| 2017/0338312 A1 * | 11/2017 | Treossi | H01L 21/683 |
| 2018/0080171 A1 | 3/2018 | Zheng et al. | |
| 2019/0292722 A1 * | 9/2019 | Lin | D06M 11/83 |

FOREIGN PATENT DOCUMENTS

| | | |
|---|---|---|
| CN | 207304957 U | 5/2018 |
| TW | 201600460 A | 1/2016 |

* cited by examiner

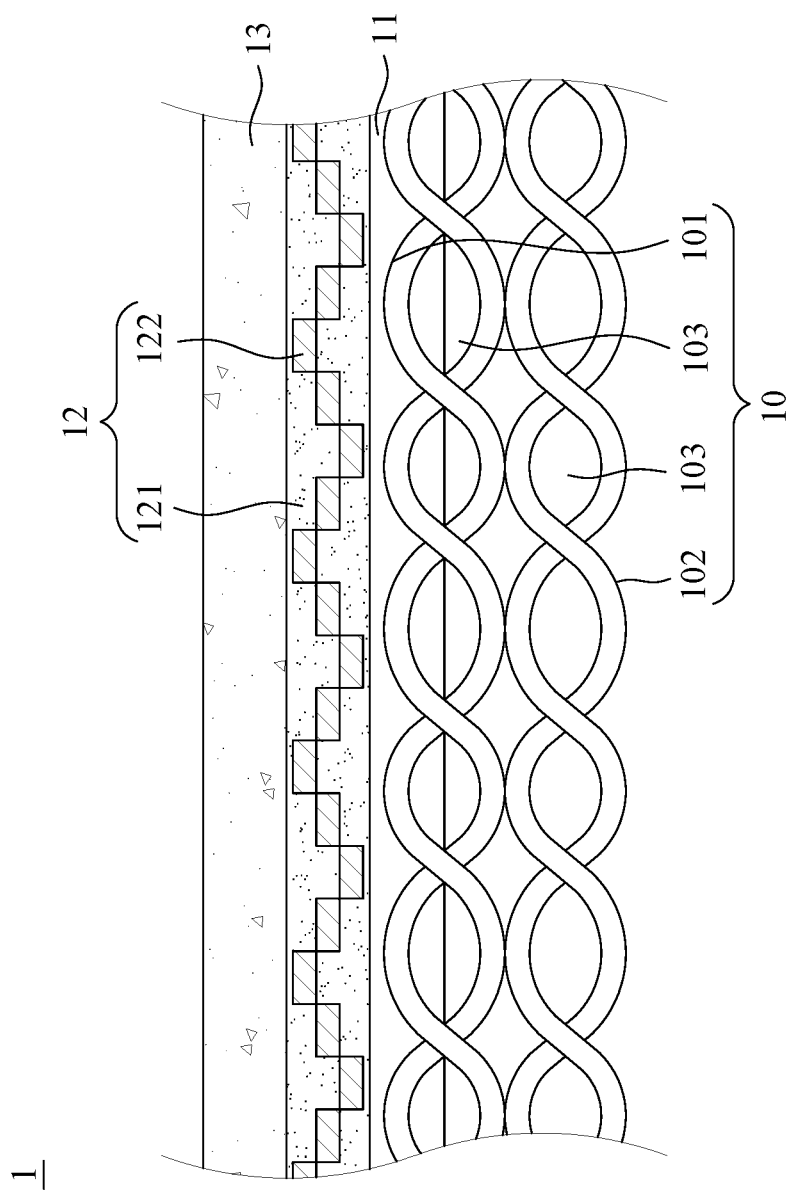

METHOD OF MANUFACTURING GRAPHENE CONDUCTIVE FABRIC

CROSS-REFERENCE TO RELATED APPLICATION

This application claims the priority of Taiwanese patent application No. 107132555, filed on Sep. 14, 2018, which is incorporated herewith by reference.

FIELD OF THE INVENTION

The present application relates to a method of manufacturing a fabric having conductive function, especially relates to a method of manufacturing a graphene conductive fabric.

BACKGROUND OF THE INVENTION

With growth of economy and improvement of living standard, in addition to the basic demands of warmth and appearance on textiles in the past, the textiles that emphasize functionalities are gradually popular to people; and with rise of health awareness, people hope that physiological state can be actively monitored by wearable devices, so as to early response to physiological abnormalities. Therefore, current technology has developed functional textiles such as smart clothing and thermostatic clothing, the smart clothing are made by embedding real time physiological state monitoring sensors in fabrics, and the thermostatic clothing are made by embedding temperature adjusting devices in fabrics.

The first condition of the functional textiles to achieve the aforesaid functions is to make the fabrics have conductivity, so as to transmit electronic signals of the physiological monitoring sensors, or to keep warm when the fabrics connect to the power supply. The current technology, such as U.S. Pat. No. 6,957,525B2, discloses a conductive fabrics formed by weaving, knitting or non-weaving metal wires and traditional yarns. Although the metal wires have excellent conductive performance, mechanical property of the metal wires is relatively fragile, friction between different clothing, friction between clothing and body, or sweat erosion easily causes breakage of the metal wires, and there are doubts about whether human body contacting the metal has an impact on health.

To improve the problem of the metal wires, U.S. Pat. No. 7,767,298B2 discloses a method of manufacturing composite conductive yarns formed by adding carbon black to polyester yarns. However, there is a limitation on the amount of the carbon black added in the polyester yarns, the composite conductive yarns obtained by the method has a resistance more than $10^6$ ohm that is far higher than a resistance lower than $10^2$ ohm required by the smart clothing, the composite conductive yarn can only be used for an antistatic product, and cannot be used for the smart clothing.

To improve the problem of insufficient conductivity caused by drawing the yarns together with conductive materials, U.S. patent publication No. 20130090030A1 discloses a method of manufacturing a conductive fiber by using carbon nanotubes, the method include: dispersing the carbon nanotubes in a suspension solution, and adding a curable resin therein; coating the suspension solution on surfaces of fibers to form the conductive fibers, a resistance of the conductive fibers can be lower than $10^6$ ohm. U.S. patent publication No. 20180080171A1 discloses a method of manufacturing a conductive fiber by using metal particles, the method includes: coating the metal particles on surfaces of the fibers to form the conductive fibers, a conductivity of the conductive fibers can be 1 ohm or less. Number of washable times is a very important test in evaluating application of the textiles, and the minimum number of washable times for the commercial textiles is 25. Although the methods of manufacturing the conductive fibers by coating the conductive materials can effectively enhance the conductivity of the conductive fibers, for example, coating the metal particles can reduce the resistance of the fabrics to 0.9 ohm; after the conductive fibers disclosed in aforementioned patent applications are washed four times, the resistance thereof has sharply risen to 73.8 ohm, they are obviously unable to pass the washable test.

Therefore, how to make the fabrics meet the conductivity required by the functional clothing, meet the standard of the washable test, and not affect health is the main aspects of the present application.

SUMMARY OF THE INVENTION

To achieve the aforesaid aspects, the present application provides a graphene conductive fabric including a fibrous tissue, hot glue layer, a graphene conductive layer and a hydrophobic protective layer. The fibrous tissue has interstices. The hot glue layer adheres to the fibrous tissue. The graphene conductive layer adheres to the hot glue layer and not to fill the interstices, the graphene conductive layer includes at least a curable resin and nano-graphene sheets dispersed in the curable resin. The hydrophobic protective layer is disposed on the graphene conductive layer.

To achieve the aforesaid aspects, the present application provides a method of manufacturing a graphene conductive fabric, the method includes: mixing a first solvent, a second solvent and nano-graphene sheets, dispersing the nano-graphene sheets with a mechanical force to form a graphene suspension solution, wherein a boiling point of the first solvent is not greater than 80° C., and a boiling point of the second solvent is not less than 120° C.; adding at least a curable resin to the graphene suspension solution, dispersing the nano-graphene sheets and the curable resin with the mechanical force to form a graphene resin solution; coating or printing the graphene resin solution on a hydrophobic protective layer, curing the graphene resin solution to form a graphene conductive layer adhered to the hydrophobic protective layer; coating a hot glue layer on the graphene conductive layer; and attaching a fibrous tissue on the hot glue layer, heating and pressing the fibrous tissue to allow the hot glue layer respectively adhere to the graphene conductive layer and the fibrous tissue, to form a graphene conductive fabric.

The fibrous tissue includes a lot of interstices, the conductive material on the surface of the fibrous tissue by a direct coating will cause the conductive material to fill the interstices of the fibrous tissue, and thus the conductivity of the fabrics will be reduced. According to the present application, the graphene resin of high conductivity is prepared, the graphene resin is coated on the hydrophobic protective layer, the graphene resin is cured to form the graphene conductive layer, the hot glue is covered on the graphene conductive layer; by the hot glue adhering to the graphene conductive layer and the fibrous tissue, the graphene conductive layer can be prevented from filling the interstices of the fibrous tissue, so as to keep the conductivity thereof, and the hydrophobic protective layer can protect the graphene conductive layer from exfoliation caused by washing. The method of manufacturing the graphene conductive fabric according to present application is compatible with current textile manufacturing processes, and the manufacturing cost of the method can be effectively reduced, so that the method according to the present application has broad applicability in the industries.

BRIEF DESCRIPTION OF THE DRAWINGS

FIGURE is a cross-sectional view schematically illustrating a graphene conductive fabric according to the present application.

DETAILED DESCRIPTION OF PREFERRED EMBODIMENTS

The technical features and other advantages of the present application will become more readily apparent to those ordinarily skilled in the art, by referring the following detailed description of embodiments of the present application in conjunction with the accompanying drawing. In order to further clarify the technical means adopted in the present application and the effects thereof, the FIGURES schematically illustrate the relative relationship between the main elements, but is not based on the actual size; therefore, thickness, size, shape, arrangement and configuration of the main elements in the FIGURE are only for reference, not intended to limit the scope of the present application.

The resistance of the graphene is lower than the resistances of copper and silver, and it is the thinnest, hardest and least resistivity material in the world currently. In the present application, by utilizing the high conductivity of the graphene, the graphene conductive layer formed by combining the curable resin with the nano-graphene sheets can be used as the conductive lines of the physiological sensors or electric heating elements; the fabrics including the graphene conductive layer can effectively increase design flexibility of the functional clothing, and significantly reduce the manufacturing cost thereof.

FIGURE is a cross-sectional view schematically illustrating a graphene conductive fabric according to the present application. As shown in FIGURE, the graphene conductive fabric 1 includes a fibrous tissue 10, a hot glue layer 11, a graphene conductive layer 12 and a hydrophobic protective layer 13. The fibrous tissue 10 has a first tissue surface 101, a second tissue surface 102 and interstices 103 between the first tissue surface 101 and the second tissue surface 102. The hot glue layer 11 adheres to the first tissue surface 101 of the fibrous tissue 10. The graphene conductive layer 12 adheres to the hot glue layer 11 and not to fill the interstices 103 of the fibrous tissue 10, the graphene conductive layer 12 includes at least a curable resin 121 and nano-graphene sheets 122 dispersed in the curable resin 121. The hydrophobic protective layer 13 is disposed on the graphene conductive layer 12, and it can prevent the graphene conductive layer 12 from exfoliation caused by washing.

The fibrous tissue 10 is, for example but not limited to, a knitted fabric or woven fabric of nylon, polyester or acrylic fibers, a thickness thereof usually is in a range of 50-500 micrometers (μm). Pores sizes of the interstices 103 are inversely proportional to the number of the fibers per unit area (i.e. fiber count) and textile method (i.e. the higher the fiber count, the smaller the pore sizes). A thickness of the hot glue layer 11 is not greater than a thickness of the graphene conductive layer 12, and the thickness of the hot glue layer 11 is, for example, in a range of 1-20 μm, the hot glue layer 11 is selected from ethylene vinyl acetate copolymer and polyamide. The thickness of the graphene conductive layer 12 is not greater than the thickness of the fibrous tissue 10, the thickness of the graphene conductive layer 12 is, for example, in a range of 10-50 μm. The curable resin 121 is selected from polyurethane, polymethyl methacrylate, polyethylene terephthalate, silicone resin, and a combination thereof. The nano-graphene sheets 122 have a bulk density in a range of 0.005-0.05 g/cm$^3$, a thickness in a range of 0.68-10 nanometers (nm), and a lateral plane size in a range of 1-100 μm. A thickness of the hydrophobic protective layer 13 is in a range of 10-100 μm, and the hydrophobic protective layer 13 can be selected from polyurethane and silicone resin.

The curable resin usually is an insulating material, a weight ratio of the curable resin in the conventional graphene conductive coating is higher than 50 wt % to increase the adhesion of the conventional graphene conductive coating, such the conventional graphene conductive coating has a volume resistance in a range of $10^5$-$10^{12}$ ohm*cm that has only antistatic effect. In the present application, the graphene conductive fabric 1 has a sandwich-like structure formed by the graphene conductive layer 12 interposed between the hot glue layer 11 and the hydrophobic protective layer 13, and the sandwich-like structure can significantly improve the adhesion of the graphene conductive layer 12 to the fibrous tissue 10, and maintain integrity of the graphene conductive network; accordingly, it is worthy to note that a weight ratio of the nano-graphene sheets 122 in the graphene conductive layer 12 can be increased to a range of 60-95 wt %, the volume resistance of the graphene conductive layer 12 can be reduced to a range of $10^{-2}$-$10^3$ ohm*cm that meets the conductivity required by the functional clothing.

Due that the nano-graphene sheets 122 have the bulk density in the range of 0.005-0.05 g/cm$^3$, the volume of nano-graphene sheets 122 is far greater than the volume of the curable resin 121, the nano-graphene sheets 122 of higher proportion are not easily to be uniformly mixed with the curable resin 121 of lower proportion, carbon black or graphite can be added to the nano-graphene sheets 122 to reduce the volume of the nano-graphene sheets 122, so as to facilitate the nano-graphene sheets 122 uniformly dispersed to form the graphene conductive network.

The present application provides a method of manufacturing the graphene conductive fabric, the method includes following steps. A step of preparing a graphene suspension solution includes: mixing solvents and nano-graphene sheets, dispersing the nano-graphene sheets with a mechanical force to form the graphene suspension solution, wherein the solvents include a first solvent and a second solvent, a boiling point of the first solvent is not greater than 80° C., and a boiling point of the second solvent is not less than 120° C. A step of preparing a graphene resin solution includes: adding at least a curable resin to the graphene suspension solution, and dispersing the nano-graphene sheets and the curable resin with the mechanical force to form the graphene resin solution. A step of forming a graphene conductive layer includes: coating or printing the graphene resin solution on a hydrophobic protective layer, and removing the solvents in the graphene resin solution by heating to form the graphene conductive layer. A step of forming a hot glue layer includes: coating a hot glue to a surface of the graphene conductive layer. A step of laminating a fibrous tissue includes: attaching the fibrous tissue to the hot glue layer, heating and pressing the fibrous tissue to make the hot glue layer respectively adhere to the graphene conductive layer and the fibrous tissue, so as to form the graphene conductive fabric.

In the step of preparing the graphene suspension solution, due a surface tension of the graphene is in a range of 45-50 mJ/m$^2$, if the surface tension difference between the graphene and the solvent was too large, the nano-graphene sheets are easy to agglomerate each other in the solvent, and not easy to be uniformly dispersed. To select the solvent having the surface tension close to the surface tension of the graphene helps the dispersion of the graphene in the solvent, but the solvent of higher boiling point is not easy to be removed; therefore, the solvent for preparing the graphene suspension solution is made by combining the first solvent of lower boiling point with the second solvent of surface tension close to the graphene. Due the surface tension of the second solvent matches to the surface tension of the graphene, the mechanical force generated by general dispersion equipment can effectively disperse the nano-graphene sheets in the solvents, and the solvents are easily removed. The mechanical force of the dispersion equipment is, for example, ultrasonic wave, homogeneous stirring, ball milling and high pressure shearing.

The first solvent can be selected from acetone, butanone, butyl alcohol, ethyl acetate, butyl acetate, and a combination thereof; the second solvent can be selected from N,N-dimethylacetamide, dimethyl sulfoxide, dimethyformamide, dimethylacetamide, and a combination thereof.

In the step of preparing graphene resin solution, due the combination of the first solvent and the second solvent can keep the dispersion of the nano-graphene sheets, even the curable resin has a higher viscosity, the mechanical force of the aforesaid dispersion equipment is sufficient to uniformly disperse the nano-graphene sheets in the graphene resin solution. The curable resin can be selected from polyurethane, polymethyl methacrylate, polyethylene terephthalate, silicone resin, and a combination thereof.

In the step of forming the graphene conductive layer, the graphene resin solution is applied to the surface of the hydrophobic protective layer by blade coating or screen printing, and the graphene conductive layer completely or partially cover the surface of the hydrophobic protective layer; the solvents in the graphene resin solution are removed by heating, and the graphene conductive layer is formed. The graphene conductive layer can completely or partially covering the surface of the hydrophobic protective layer (i.e. the graphene conductive layer completely or partially masks the fibrous tissue). The hydrophobic protective layer disposed on a release film can be used for facilitating the formation of the graphene conductive layer and the subsequent processing steps. If there is a specific conductive line design on the graphene conductive fabric, the graphene conductive layer can be patterned by using a laser.

In the step of forming the hot glue layer, the hot glue layer is applied to the surface of graphene conductive layer by blade coating or screen printing. The hot glue layer is selected from polyurethane and silicone resin.

In the step of laminating a fibrous tissue, attaching the fibrous tissue on the hot glue layer, heating and pressing the fibrous tissue to make the hot glue layer respectively adhere to the graphene conductive layer and the fibrous tissue, and the graphene conductive fabric is formed. In an embodiment of using the hydrophobic protective layer disposed on the release film, the graphene resin solution is applied to the surface of the hydrophobic protective layer opposite to the release film, after the fibrous tissue laminated on the hot glue layer, the release film is removed to expose the hydrophobic protective layer, the subsequent steps of processing the graphene conductive fabric, such as dyeing, cutting, connecting to electronic devices, can be performed.

In order that those skilled in the art can more clearly understand various applications and effects of the present application, the practical operations of the present application will be specifically illustrated in details with following exemplary embodiments.

Exemplary Embodiment 1

Butanone is used as the first solvent, N,N-dimethylacetamide is used as the second solvent, the butanone and the N,N-dimethylacetamide are mixed in a volume ratio of 8:2, and a mixed solvent is formed. Nano-graphene sheets are added to the mixed solvent in a weight ratio of 10:90, the nano-graphene sheets are uniformly dispersed in the mixed solvent with a homogenizer, and a graphene suspension solution is formed, wherein the nano-graphene sheets accounts for 10 wt % of the graphene suspension solution. Polyurethane resin (20 wt % solid content) of 300 g is added to the graphene suspension solution of 1000 g, the nano-graphene sheets and the polyurethane resin are dispersed with the homogenizer, and a graphene resin solution is formed. The graphene resin solution is printed on a hydrophobic silicon layer with a screen printing, the graphene resin solution is heated to 100° C., the solvents in the graphene resin solution are removed, and the cured graphene conductive layer is obtained. A hot glue layer of ethylene vinyl acetate copolymer is coated on a surface of the graphene conductive layer. A fibrous tissue is attached to the hot glue layer, and the fibrous tissue is pressed and heated to 95° C., the hot glue layer respectively adheres to the graphene conductive layer and the fibrous tissue, and a graphene conductive fabric is formed. The hydrophobic silicon layer can effectively prevent the graphene conductive layer, and increase the washable times of the graphene conductive fabric.

Exemplary Embodiment 2

Butanone is used as the first solvent, dimethyl sulfoxide is used as the second solvent, the butanone and the dimethyl sulfoxide are mixed in a volume ratio of 9:1, and a mixed solvent is formed. Nano-graphene sheets are added to the mixed solvent in a weight ratio of 15:85, the nano-graphene sheets are uniformly dispersed in the mixed solvent with a homogenizer, and a graphene suspension solution is formed, wherein the nano-graphene sheets accounts for 15 wt % of the graphene suspension solution. Polyurethane resin (35 wt % solid content) of 100 g is added to the graphene suspension solution of 400 g, the nano-graphene sheets and the polyurethane resin are dispersed with a revolution-rotation motion mixer at a rotation speed of 1000 rpm and a revolution speed of 400 rpm, and a graphene resin solution is formed. The graphene resin solution is printed on a hydrophobic silicon layer with a screen printing, the graphene resin solution is heated to 100° C., the solvents in the graphene resin solution are removed, and the cured graphene conductive layer is obtained. A hot glue layer of thermoplastic polyurethane is coated on a surface of the graphene conductive layer. A fibrous tissue is attached to the hot glue layer, and the fibrous tissue is pressed and heated to 105° C., the hot glue layer respectively adheres to the graphene conductive layer and the fibrous tissue, and a graphene conductive fabric is formed.

Exemplary Embodiment 3

Butanone is used as the first solvent, dimethyl sulfoxide is used as the second solvent, the butanone and the dimethyl sulfoxide are mixed in a volume ratio of 9:1, and a mixed solvent is formed. Nano-graphene sheets are added to the mixed solvent in a weight ratio of 15:85, the nano-graphene sheets are uniformly dispersed in the mixed solvent with a homogenizer, and a graphene suspension solution is formed, wherein the nano-graphene sheets accounts for 15 wt % of the graphene suspension solution. Polyurethane resin (35 wt % solid content) of 100 g is added to the graphene suspension solution of 400 g, the nano-graphene sheets and the polyurethane resin are dispersed with a revolution-rotation motion mixer at a rotation speed of 1000 rpm and a revolution speed of 400 rpm, and a graphene resin solution is formed. The graphene resin solution is coated on a surface of a release film of polyester with a blade, the graphene resin solution is heated to 100° C., the mixed solvent in the graphene resin solution are removed, and the cured graphene conductive layer is obtained. A hot glue layer of polyurethane is coated on a surface of the graphene conductive layer. A fibrous tissue is attached to the hot glue layer, and the fibrous tissue is pressed and heated to 90° C., the hot glue layer respectively adheres to the graphene conductive layer and the fibrous tissue, the release film is removed, and a graphene conductive fabric having a surface resistance of $2*10^{-2}$ ohm/sq is formed.

Exemplary Embodiment 4

Butanone is used as the first solvent, isophorone is used as the second solvent, the butanone and the isophorone are mixed in a volume ratio of 1:1, and a mixed solvent is formed. Nano-graphene sheets of 40 g, carbon black of 40 g and the mixed solvent of 400 g are mixed by a homogenizer, and a graphene suspension solution is formed. Polyester resin (55 wt % solid content) of 230 g and the graphene suspension solution of 1200 g are mixed by a revolution-rotation motion mixer at a rotation speed of 1000 rpm and a revolution speed of 400 rpm, and a graphene resin solution of a viscosity greater than 20000 cps is formed. The graphene resin solution is placed in a dispersion equipment, the nano-graphene sheets and the carbon black are uniformly dispersed in the polyester resin through two dispersing processes, wherein the first dispersing process includes allowing the graphene resin solution pass through a slit of 150 μm at a velocity of 1 L/min under a pressure of 20 bar, the second dispersing process includes allowing the graphene resin solution pass through a slit of 300 μm at a velocity of 2 L/min under a pressure of 24 bar. The graphene resin solution is printed on a hydrophobic polyurethane layer disposed on a release film of polyester by a screen of 200 mesh, the graphene resin solution is heated to 130° C., the mixed solvent in the graphene resin solution are removed, and the cured graphene conductive layer is obtained. A hot glue layer of polyurethane is coated on a surface of the graphene conductive layer. A fibrous tissue is attached to the hot glue layer, and the fibrous tissue is pressed and heated to 90° C., the hot glue layer respectively adheres to the graphene conductive layer and the fibrous tissue, the release film is removed to expose the hydrophobic polyurethane layer, and a graphene conductive fabric having a surface resistance of 150 ohm/sq that meets the conductive requirement of the physiological sensors is formed.

Exemplary Embodiment 5

Butyl alcohol is used as the first solvent, isophorone is used as the second solvent, the butyl alcohol and the isophorone are mixed in a volume ratio of 8:2, and a mixed solvent is formed. Nano-graphene sheets of 120 g, carbon black of 130 g and the mixed solvent of 680 g are mixed by a homogenizer, and a graphene suspension solution is formed. Alkyd resin (55 wt % solid content) of 300 g and the graphene suspension solution of 930 g are mixed by a grinder at a rotation speed of 2000 rpm, the nano-graphene sheets and the carbon black are uniformly dispersed in the alkyd resin, and a graphene resin solution is obtained. The graphene resin solution is coated on a hydrophobic polyurethane layer disposed on a release film of polyester by a blade, the graphene resin solution is heated to 100° C., the mixed solvent in the graphene resin solution are removed, and the cured graphene conductive layer is obtained. A hot glue layer of polyurethane is coated on a surface of the graphene conductive layer. A fibrous tissue is attached to the hot glue layer, and the fibrous tissue is pressed and heated to 90° C., the hot glue layer respectively adheres to the graphene conductive layer and the fibrous tissue, the release film is removed to expose the hydrophobic polyurethane layer, and a graphene conductive fabric having a surface resistance of 130 ohm/sq that meets the conductive requirement of the physiological sensors is formed.

Exemplary Embodiment 6

N-butyl acetate is used as the first solvent, isophorone is used as the second solvent, the N-butyl acetate and the isophorone are mixed in a volume ratio of 9:1, and a mixed solvent is formed. Nano-graphene sheets of 40 g, carbon black of 50 g and the mixed solvent of 360 g are mixed by a homogenizer, and a graphene suspension solution is formed. Silicon resin of 23 g and the graphene suspension solution of 450 g are mixed by a revolution-rotation motion mixer at a rotation speed of 1000 rpm and a revolution speed of 400 rpm, and a graphene resin solution of a viscosity greater than 20000 cps is formed. The graphene resin solution is printed on a hydrophobic polyurethane layer disposed on a release film of polyester by a screen of 200 mesh, the graphene resin solution is heated to 130° C., the mixed solvent in the graphene resin solution are removed, and the cured graphene conductive layer is obtained. A hot glue layer of polyurethane is coated on a surface of the graphene conductive layer. A fibrous tissue is attached to the hot glue layer, and the fibrous tissue is pressed and heated to 90° C., the hot glue layer respectively adheres to the graphene conductive layer and the fibrous tissue, the release film is removed to expose the hydrophobic polyurethane layer, and a graphene conductive fabric is formed. The graphene conductive fabric has a surface resistance of 300 ohm/sq and tensile property, so that can prevent conductive lines from breakage, meet the requirement of the conductive lines for physiological sensors and increase wearing comfort.

Washing Test

According to test standard of AATCC 135, the graphene conductive fabrics of Exemplary embodiments 4-6 are washed for 20 times, surface resistances of the graphene conductive fabrics before and after washing are measured, to test adhesion fastness of the graphene conductive layers. The measuring results are shown in Table.

TABLE

| Sample | Surface resistance (ohm/sq) | |
| --- | --- | --- |
|  | before washing | after washing |
| Exemplary embodiment 4 | 150 | 153 |
| Exemplary embodiment 5 | 130 | 148 |
| Exemplary embodiment 6 | 300 | 310 |

As shown in Table, even the natural graphite or conductive carbon black is added to the graphene conductive fabrics, there is not much difference of the surface resistances between the graphene conductive fabrics before and after washing; especially, the surface resistance of the graphene conductive layer of Exemplary embodiment 6 after washing still meets the resistance specification of the conductive lines, it can prove that the graphene conductive fabrics according to the present application have excellent conductivity and washable times.

In the present application, the graphene suspension solution is prepared by the combination of solvents of low boiling point and high surface tension; the graphene resin solution is prepared by mixing the graphene suspension solution and the hydrophobic resin; the graphene conductive layer is formed by curing the graphene resin solution; then, the graphene conductive layer is covered with the hot glue that can transfer the graphene conductive layer to the fibrous tissue, and prevent the graphene conductive layer from filling interstices of the fibrous tissue at the same time; and the hydrophobic protective layer can prevent the graphene conductive layer from exfoliation caused by washing. By utilizing the special thermal properties and excellent conductivity of the graphene, the graphene conductive fabric according to the present application has excellent conductivity, adhesion and washable times in comparison with the current technologies of manufacturing functional fibers, and the method of manufacturing the graphene conductive fabric according to the present application do not affect the fiber yield and weaving efficiency, and effectively reduce the manufacturing cost thereof, so that the method according to the present application has broad applicability in the industries.

The exemplary embodiments described above only illustrate the principles and effects of the present application, but are not intended to limit the scope of the present application. Based on the above description, an ordinarily skilled in the art can complete various similar modifications and arrangements according to the technical programs and ideas of the present application, and the scope of the appended claims of the present application should encompass all such modifications and arrangements.

What is claimed is:

1. A method of manufacturing a graphene conductive fabric, comprising:

mixing a first solvent, a second solvent and nano-graphene sheets, dispersing the nano-graphene sheets with a mechanical force to form a graphene suspension solution, wherein a boiling point of the first solvent is not greater than 80° C., and a boiling point of the second solvent is not less than 120° C.;

adding at least a curable resin to the graphene suspension solution, dispersing the nano-graphene sheets and the curable resin with the mechanical force to form a graphene resin solution;

coating or printing the graphene resin solution on a hydrophobic protective layer, curing the graphene resin solution to form a graphene conductive layer adhered to the hydrophobic protective layer;

coating a hot glue layer on the graphene conductive layer; and attaching a fibrous tissue on the hot glue layer, heating and pressing the fibrous tissue to allow the hot glue layer respectively adhere to the graphene conductive layer and the fibrous tissue, to form a graphene conductive fabric.

2. The method of manufacturing the graphene conductive fabric according to claim 1, wherein the first solvent is selected from acetone, butanone, butyl alcohol, ethyl acetate, butyl acetate, and a combination thereof.

3. The method of manufacturing the graphene conductive fabric according to claim 1, wherein a surface tension of the second solvent is in a range of 30-60 mJ/m$^2$.

4. The method of manufacturing the graphene conductive fabric according to claim 1, wherein the second solvent is selected from N,N-dimethylacetamide, dimethyl sulfoxide, dimethyformamide, dimethylacetamide, and a combination thereof.

5. The method of manufacturing the graphene conductive fabric according to claim 1, wherein the mechanical force is selected from ultrasonic wave, homogeneous stirring, ball milling and high pressure shearing.

6. The method of manufacturing the graphene conductive fabric according to claim 1, wherein the curable resin is selected from polyurethane, polymethyl methacrylate, polyethylene terephthalate, epoxy resin, silicone resin, and a combination thereof, and the nano-graphene sheets accounts for 60-95 wt % of the graphene conductive layer.

7. The method of manufacturing the graphene conductive fabric according to claim 1, wherein the hydrophobic protective layer is formed on a release film, after the hot glue layer respectively adhered to the graphene conductive layer and the fibrous tissue, the release film is removed to expose the hydrophobic protective layer.

8. The method of manufacturing the graphene conductive fabric according to claim 1, wherein the hydrophobic protective layer is selected from silicone resin and polyurethane resin.

9. The method of manufacturing the graphene conductive fabric according to claim 1, further comprising: patterning the graphene conductive layer by using a laser, and then coating the hot glue layer on the patterned graphene conductive layer.

* * * * *